L. F. ADT.
SPRING FOR EYEGLASSES.
APPLICATION FILED MAY 9, 1905.

967,290. Patented Aug. 16, 1910.

Witnesses
Walter B. Payne
Clarence A. Bateman

Inventor
Leo F. Adt
By his Attorney

THE NORRIS PETERS CO., WASHINGTON, D. C.

UNITED STATES PATENT OFFICE.

LEO F. ADT, OF TROY, NEW YORK.

SPRING FOR EYEGLASSES.

967,290.  Specification of Letters Patent.  Patented Aug. 16, 1910.

Application filed May 9, 1905. Serial No. 259,553.

*To all whom it may concern:*

Be it known that I, LEO F. ADT, of Troy, in the county of Rensselaer and State of New York, have invented certain new and useful Improvements in Springs for Eyeglasses; and I do hereby declare the following to be a full, clear, and exact description of the same, reference being had to the accompanying drawings, forming a part of this specification, and to the reference-numerals marked thereon.

The object of my present invention is to provide an improved bridge spring for use particularly in connection with eyeglasses of the kind wherein the lenses are manipulated in applying and removing them from the wearer's nose, whereby ample length of material is provided to secure the necessary action in the spring without liability of undue strain or breakage, and an even pressure is produced by the nose guards to secure a firm hold of the eyeglasses, upon the wearer's nose, the material of the spring being so disposed that a neat and light appearance is presented in viewing the eyeglasses from the front.

To these and other ends the invention consists in certain improvements and combinations of parts all as will be hereinafter more fully explained, the novel features being pointed out in the claims at the end of the specification.

Figure 1:
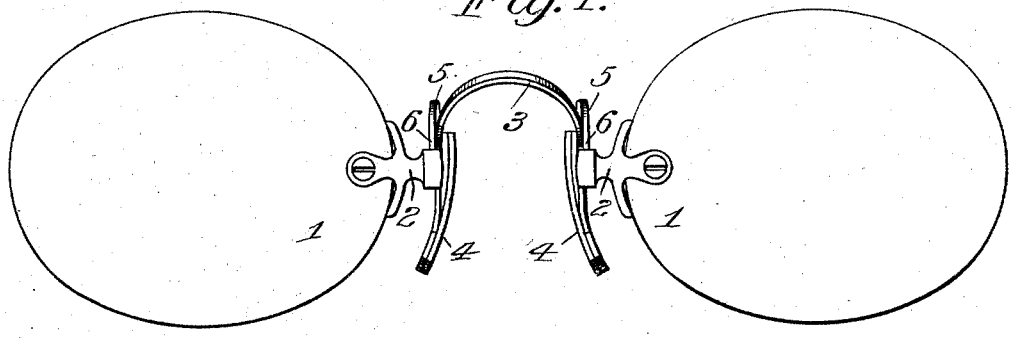
Figure 3:
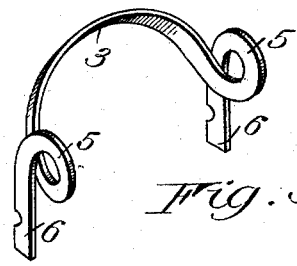
Figure 2:
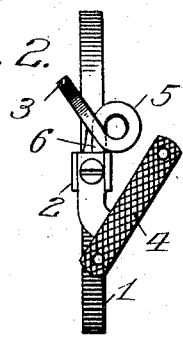
Figure 4:
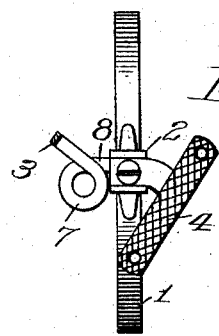

In the drawing: Figure 1 is a front elevation of a pair of eyeglasses fitted with a bridge spring constructed in accordance with my invention; Fig. 2 is a transverse sectional view through the bridge spring looking toward one of the lenses; Fig. 3 is a perspective view of the spring detached from the lenses; and Fig. 4 is a view similar to Fig. 2, showing the coil of the spring arranged forward of the plane of the lenses and connected to the latter by a horizontal attaching arm.

The same numerals of reference in the several figures indicate similar parts.

The accompanying drawing illustrates two embodiments of my invention wherein 1 designates the lenses provided with suitable attaching devices 2 formed to receive the attaching arms of the spring 3 and the guards 4. This spring may be formed substantially as shown in Figs. 1, 2 and 3, that is, its central portion may be arched so as to bridge the nose, and its ends are bent rearwardly and then formed into flat coils 5 the sides of which lie in planes substantially vertical and perpendicular to the plane of the lenses, and the free ends of the coils are formed into attaching arms 6, which in one form of the invention, extend vertically and connect with the attaching devices from above, and this arrangement will place the coils usually above the attaching devices, and that portion of the spring connecting the coils will form what is known as a "saddle bridge" and the coils will be presented flatwise to the wearer's nose. But these coils in the spring may occupy different positions relatively to the eyeglass mounting, and in Fig. 4 of the drawing I have shown the coil 7 as arranged forward of the attaching device, the free end 8 of the coil in this arrangement of the spring preferably extending horizontally to connect with the attaching device from the front.

Various other arrangements of the coils with respect to the body of the spring and the mounting are contemplated by me in carrying my invention into practice, and by arranging the coils in the spring in such a way that their sides lie in vertical planes substantially perpendicularly to the plane of the lenses, the additional length of material contained in these coils will not appear prominently, as the flat coils will be presented edgewise when the eyeglasses are viewed from the front and rear, and this is particularly advantageous when the spring is composed of flat material, in which case the coils are formed by bending the material edgewise, and this is generally preferable.

The coils in the spring shown in Fig. 3 are formed by extending the material from the central portion thereof rearwardly, thence upwardly, forwardly and finally downwardly to the attaching devices, and in the spring shown in Fig. 4, the coils are formed by extending the material from the central portion thereof rearwardly, thence downwardly, upwardly and finally rearwardly to the attaching devices, but these are particular forms of my invention to which I do not limit myself, for in applying a spring of this kind to the mountings of eyeglasses, the positions of these coils may be varied to give in each case the proper separation or action to the nose-guards.

I claim as my invention:

1. In eyeglasses, the combination with the lenses, of a bridge spring attached to the lenses, and having a bridging portion and coils only at the ends of the bridging portion, the sides of said coils lying in vertical planes arranged transversely to the lenses, and nose guards secured to the mounting beyond the coils in the bridge spring.

2. In eyeglasses, the combination with the lenses, of a bridge spring having an arched central portion, the ends of the spring being composed of flat material bent edgewise into resilient coils, the ends of the latter being attached to the lenses and nose guards secured to the mounting beyond the coils.

3. In eyeglasses, the combination with the lenses, of a bridge spring composed of flat material having coils formed therein by bending the material edgewise and nose guards secured to the mounting beyond the coils.

4. In eyeglasses, the combination with the lenses, of a bridge spring having an arched central portion and rearwardly-extending arms formed into coils having their sides arranged substantially flatwise of the sides of the wearer's nose and nose guards secured to the mounting beyond the coils.

5. In eyeglasses, the combination with the lenses, of a bridge connecting the lenses and composed of flexible material having a bridging portion and portions near the ends only of the bridging portion, coiled on horizontal axes arranged substantially parallel to the plane of the lenses, and nose guards secured to the mounting beyond the coiled portions of the bridge.

6. In eyeglasses, the combination with the lenses, of a bridge spring connecting them and having a bridging portion and resilient coils only near the ends of the bridging portion, said coils being formed on axes arranged substantially horizontal and parallel to the plane of the lenses, and nose guards secured to the mounting beyond the coiled portions of the bridge.

7. In eyeglasses, the combination with the lenses, of a bridge spring for connecting them embodying a substantially rigid intermediate portion adapted to span the wearer's nose, and end portions extending therefrom and coiled to form complete convolutions extending in planes arranged transversely to the plane of the lenses and nose guards secured to the mounting beyond the coiled portions.

8. In eyeglasses, the combination with the lenses and boxes, of a bridge having a bridging portion and a vertical coil near each end of the bridging portion, said coils lying in planes substantially transverse to the plane of the lenses and being located above the boxes.

9. In eyeglasses, the combination with a pair of lens attaching devices having boxes, of a bridge having a bridging portion, vertical coils near each end of the bridging portions lying in planes substantially transverse to the plane of the lenses and attaching arms projecting beyond the coils and secured in the boxes.

10. In eyeglasses, the combination with a pair of lens attaching devices; of a bridge spring having a bridging portion, vertical coils near each end of the bridging portion lying in planes substantially transverse to the plane of the lenses and portions beyond the coils substantially in the vertical planes thereof secured to the lens attaching devices; and nose guards secured to the mounting beyond the coils.

11. In eyeglasses, the combination with a pair of lens attaching devices having boxes, of a bridge spring made from flat stock and embodying a bridging portion, loops at the ends of the bridging portion arranged entirely to one side of the boxes, formed by edgewise bends in the stock and having their flat faces arranged in vertical planes substantially transverse to the plane of the lenses, and portions arranged in the vertical planes of the loops and secured in the boxes.

LEO F. ADT.

Witnesses:
H. C. BAILEY,
JAMES F. BYRON.